G. McEACHRON.
AUTOMATIC FLOUR SIFTER.
APPLICATION FILED FEB. 23, 1910.
957,438.
Patented May 10, 1910.
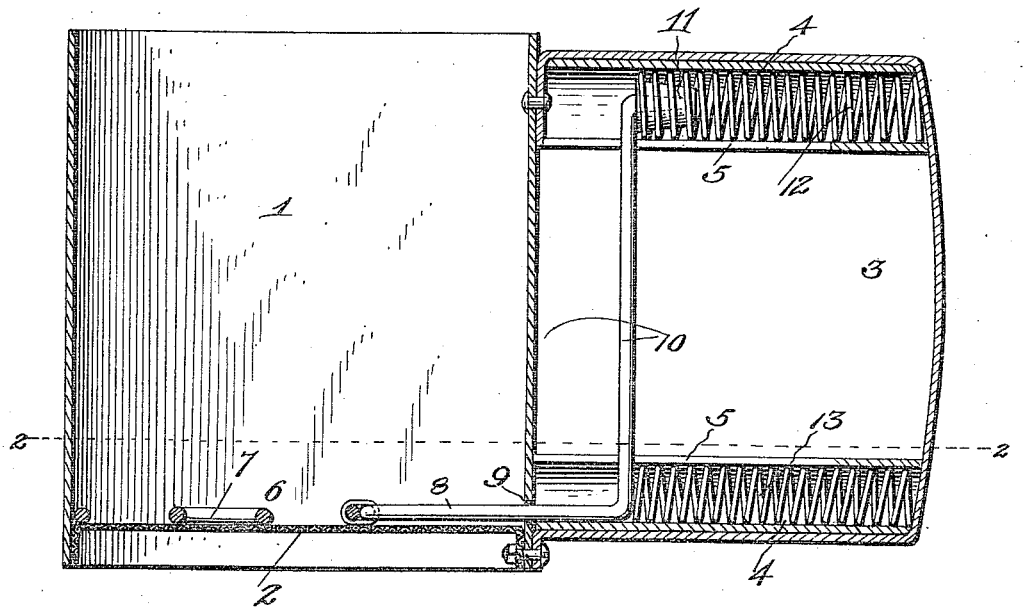
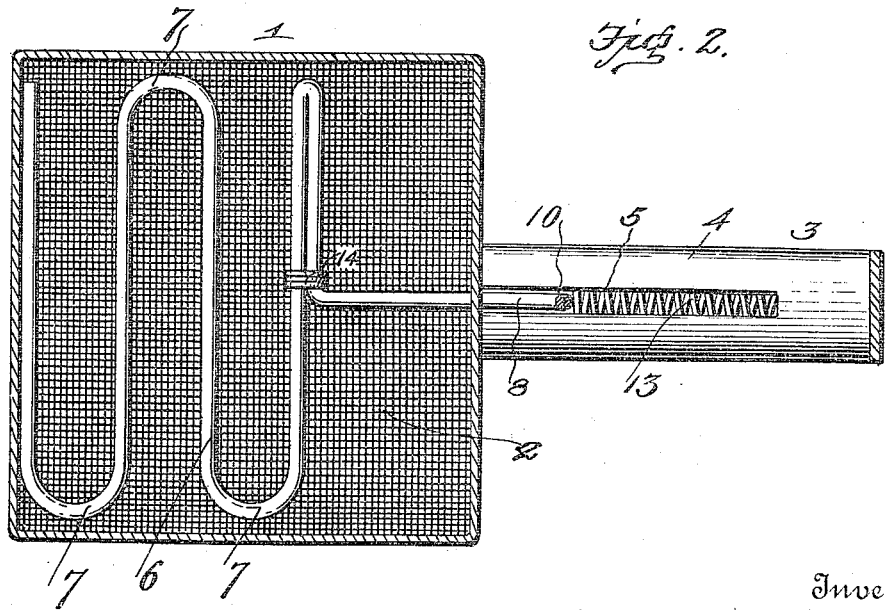
Witnesses
C. E. Hunt,
C. H. Griesbauer.
Inventor
George McEachron
by H. R. Willson & Co.
Attorneys

UNITED STATES PATENT OFFICE.

GEORGE McEACHRON, OF OKLAHOMA, OKLAHOMA.

AUTOMATIC FLOUR-SIFTER.

957,438. Specification of Letters Patent. Patented May 10, 1910.

Application filed February 23, 1910. Serial No. 545,343.

*To all whom it may concern:*

Be it known that I, GEORGE MCEACHRON, a citizen of the United States, residing at Oklahoma city, in the county of Oklahoma and State of Oklahoma, have invented certain new and useful Improvements in Automatic Flour-Sifters; and I do declare the following to be a full, clear, and exact description of the invention, such as will enable others skilled in the art to which it appertains to make and use the same.

This invention relates to improvements in automatic flour sifters.

One object of the invention is to provide a flour sifter having an agitator adapted to work automatically in one direction, thus greatly reducing the labor necessary for operating the same.

Another object is to provide a flour sifter of this character which will be simple, strong and durable in construction, efficient in operation and well adapted to the purpose for which it is designed.

With the foregoing and other objects in view, the invention consists of certain novel features of construction, combination and arrangement of parts as will be more fully described and particularly pointed out in the appended claim.

In the accompanying drawings, Figure 1 is a vertical longitudinal section of a flour sifter constructed in accordance with the invention; Fig. 2 is a horizontal section on the line 2—2 of Fig. 1.

In the embodiment of the invention, I provide a receptacle 1 which is here shown and is preferably of rectangular form and is provided in its lower end with a screen or sifting bottom 2. Secured to one side of the receptacle 1 is a handle 3 on the inner sides of the upper and lower bars of which are secured tubular spring casings 4, said casings having formed in their inner sides longitudinal slots 5.

Arranged in the receptacle 1 and having a sliding engagement with the inner side of the screen bottom 2 is an agitator 6, said agitator being preferably formed from a single piece of wire rod bent to form a series of loops 7 and a handle portion 8, which projects through and is slidably engaged with an aperture 9 in the handle side of the receptacle. The projecting end of the handle portion 8 of the agitator is bent upwardly at a right angle to form a gripping bar 10, said bar projecting upwardly through the slot of the upper spring casing, as shown.

To the upper end of the gripping bar 10, within the upper casing 4, is secured a plug 11 which is engaged with an agitator projecting spring 12 arranged in the upper casing 4 as shown. The lower end of the gripping bar engages a similar spring 13 arranged in the lower spring casing, the pressure of said springs being exerted to project the agitator outwardly across the screen bottom of the receptacle. The inner loop of the agitator at the point where the handle is bent therefrom is preferably braced or reinforced by a band or wire 14 wound around the same, said band or wire binding the members of the loop together.

In the operation of the sifter, the handle of the receptacle is grasped by the palm of the hand, while the fingers are engaged with the gripping bar portion of the handle of the agitator, whereby when the fingers are brought to a closed position, the agitator will be retracted or drawn back across the screen bottom of the receptacle against the tension of the springs 12 and 13 in the casings 4 on the handle, and when the gripping bar is relieved of the pressure of the fingers, said springs will project the agitator or force the same back in the opposite direction across the screen, thus effectually agitating the flour and forcing the same through the screen bottom of the sifter.

By arranging the handles of the receptacle and agitator as herein shown and described and providing the springs 12 and 13, the sifter may be readily operated by one hand to retract the agitator in one direction, whereupon the same will be automatically projected in the opposite direction by the action of the springs.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim is:—

In a flour sifter, a receptacle having a screen bottom, a handle secured to one side of said receptacle, tubular spring casings secured in said handle, said casings having formed therein longitudinal slots, an agitator slidably mounted in said receptacle, said agitator comprising a wire rod bent to form a series of loops, a handle formed on said loops and projecting through one side of said receptacle, a gripping bar formed on the projecting end of the agitator and having a sliding engagement with the slots in said spring casings, and agitator projecting springs arranged in said casings to engage said gripping bar and automatically project the agitator in one direction after the same has been manually retracted in the opposite direction.

In testimony whereof I have hereunto set my hand in presence of two subscribing witnesses.

GEORGE McEACHRON.

Witnesses:
 EDWARD C. THORNE,
 JOHN U. HATCHER.